United States Patent [19]
Capdeville

[11] Patent Number: 5,205,730
[45] Date of Patent: Apr. 27, 1993

[54] GARDEN TORCH WITH REMOVABLE CONTAINER

[76] Inventor: Martin Capdeville, 4106 Storm #W., Yokima, Wash. 98908

[21] Appl. No.: 924,674

[22] Filed: Aug. 4, 1992

[51] Int. Cl.⁵ .............................................. F23D 3/24
[52] U.S. Cl. .................................. 431/320; 431/343; 362/431; 362/159; 126/47
[58] Field of Search ............... 431/320, 343, 344, 298, 431/299, 321, 322; 126/262, 43, 44, 45, 46, 47, 48, 49, 50; 362/159, 161, 162, 164, 180, 209, 431; 102/343; D26/8

[56] References Cited
U.S. PATENT DOCUMENTS

| | | |
|---|---|---|
| 314,725 | 3/1885 | Ronner ............................ 362/162 |
| 914,900 | 3/1909 | Turner et al. ....................... 431/146 |
| 1,642,260 | 9/1927 | Olsen ................................. 431/146 |
| 4,563,150 | 1/1976 | Nilsson ........................... 431/321 X |
| 4,646,213 | 2/1987 | Fanellie et al. ................ 431/298 X |
| 4,728,286 | 3/1988 | Olsen ................................. 431/320 |

Primary Examiner—Larry Jones
Attorney, Agent, or Firm—George A. Cashman

[57] ABSTRACT

A garden torch, or tiki torch, comprises a pole pointed at its lower end with a bracket attached to the top of the pole. The upper portion of the bracket is a cover with a wick and a wick hole. A beer can or soft drink can, the contents of which have been replaced with torch oil or other illuminating liquid, may have the wick inserted through the top hole in the can, and the can may then be inserted into the bracket.

10 Claims, 3 Drawing Sheets

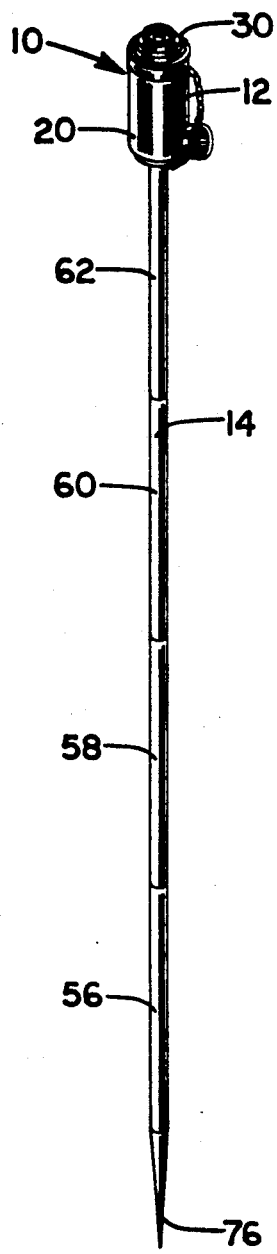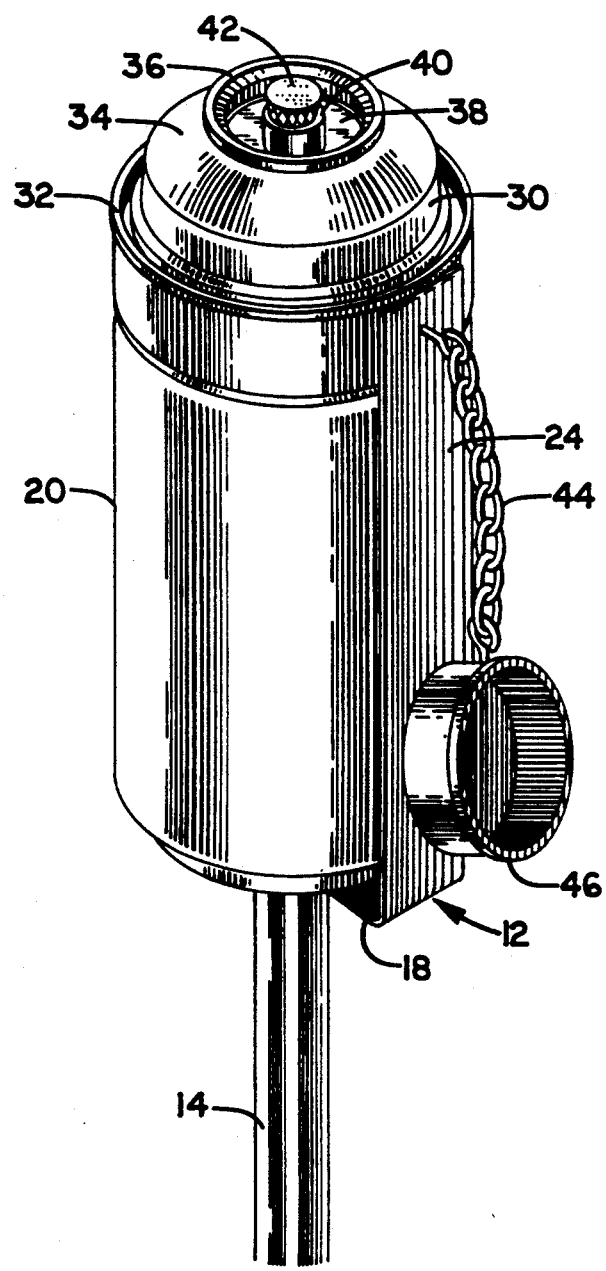
Fig. 1
Fig. 2

GARDEN TORCH WITH REMOVABLE CONTAINER

BACKGROUND OF THE INVENTION

Garden sometimes called tiki torches, are used for nighttime illumination of gardens, as well as adding a decorative touch. Such torches are commonly used in private gardens, as well as in hotel gardens, particularly in tropical or semitropical areas. The torch itself is typically elevated several feet above the ground level, and may be supported by a pipe which feeds natural gas or liquefied petroleum gas to the torch. The torch may also take the form of a torch oil container rigidly attached to the top of a pole which is inserted into the ground.

SUMMARY OF THE INVENTION

The garden torch of this invention comprises a pole-mounted U-shaped bracket, with a first leg of the U-shape attached horizontally to the top of a pole. The second leg of the bracket is a horizontally extending cover with a hole for a torch wick. The bracket is adapted to removably receive a pop-top type of soft drink or beer can, in which the usual contents have been replaced with torch oil or other suitable illuminating liquid. A slidable wick extends through the cover, and also depends downward for insertion into the illuminating liquid in the soft drink or beer can.

It is an object of this invention to provide a simple, low-cost, easily assembled garden torch.

It is a further object of this invention to provide a garden torch which can be economically packaged.

It is a further object of this invention to provide a garden torch, the height of which above the ground can be adjusted.

It is a further object of this invention to provide a promotional device for display of a given brand or trademark of a soft drink or beer.

BRIEF DESCRIPTION OF THE DRAWINGS

FIG. 1 illustrates the fully assembled garden torch.

FIG. 2 illustrates in larger scale the assembled cover, container and wick.

DETAILED DESCRIPTION OF THE INVENTION

Figure 3:
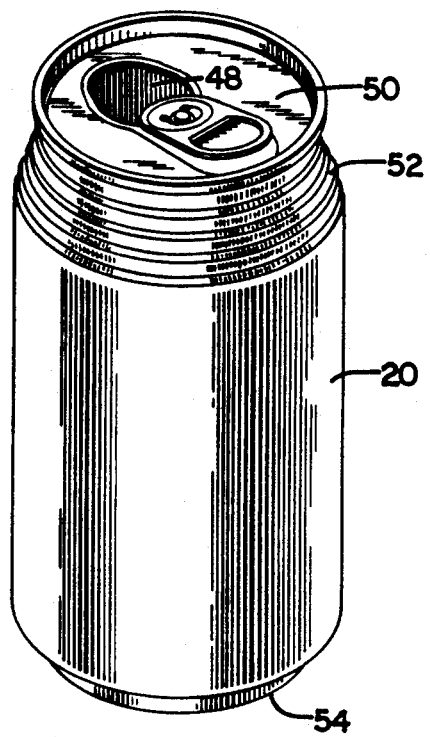
FIG. 3 illustrates the liquid container ready for use.
Figure 4:
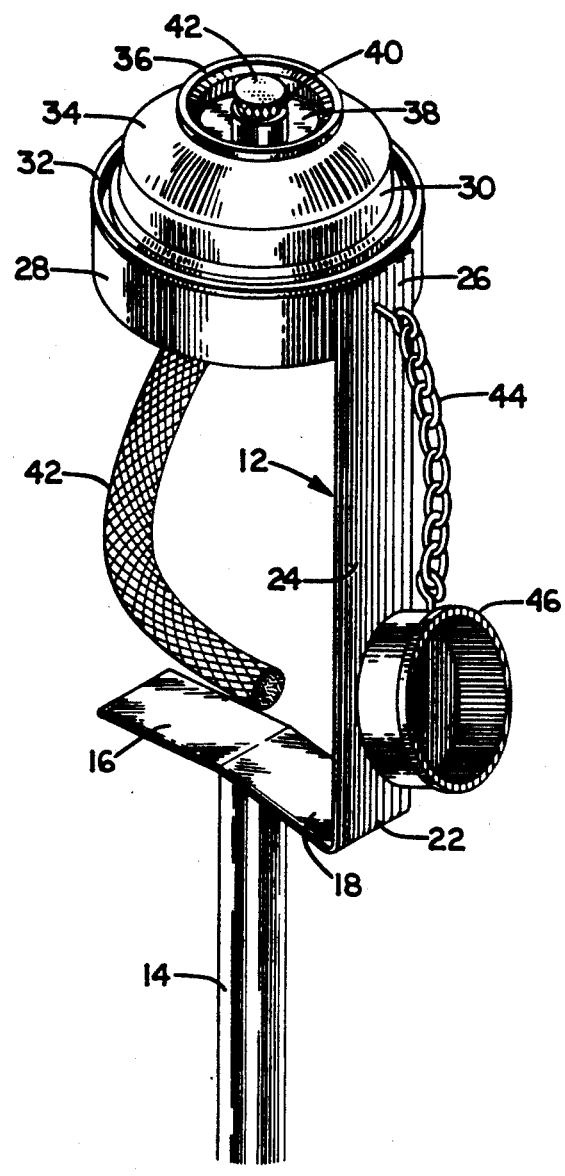
FIG. 4 illustrates the bracket, cover and wick ready for insertion of the liquid container.
Figure 5:
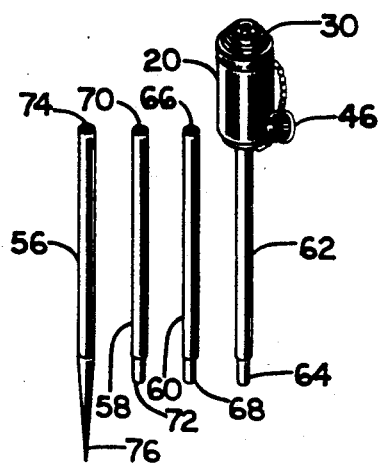
FIG. 5 illustrates, to the same scale as FIG. 1 the separability of the pole supporting the garden torch.

The preferred embodiment of the garden torch, indicated generally as 10, has bracket 12 attached to the top of segmented pole 14. The material of bracket 12 is flexible, yet will hold its shape when not flexed. Bracket 12 has first element 16 affixed to the top of pole 14 with its surface perpendicular to the centerline of pole 14. Second element 18, attached at a first end to first element 16, is inclined downward. The combination of elements 16 and 18 will accommodate the indented bottom of a soft drink can 20 or beer can 20. The second end of second element 18 is attached to lower end 22 of vertical element 24. End 26 of element 24 is attached to cylindrical portion 28 of cover 30. Cylindrical portion 28 is surmounted by bead 32. Within bead 32 is dome 34. Bead 36 surmounts dome 34. Within bead 36 is flat annular element 38. Wick guide 40, which is an open tube, is located within annular element 38. Wick 42 is slidable within wick guide 40. A small eye and chain 44 is attached to end 26 of element 24. Cap 46 is attached to the free end of chain 44. Cap 46 snaps onto bead 36 when torch 10 is not in use, to protect wick 42 from the elements.

Can 20, which contains illuminating fluid, is attached to bracket 12 by first inserting wick 42 into opening 48 in top 50 of can 20. Cover 30 is flexed apart from the lower end of bracket 12, and the upper portion 52 of can 20 is inserted within cylindrical portion 28 of cover 30. Can 20 is then moved toward element 24, and the bottom 54 of can 20 is engaged with elements 16 and 18.

Segmented pole 14 comprises sections 56, 58, 60 and 62. Lower end 64 of section 62 has a reduced diameter for sliding fit into recess 66 in section 60. Lower end 68 of section 60 has a reduced diameter for sliding fit into recess 70 in section 58. Lower end 72 of section 58 has a reduced diameter for sliding fit into recess 74 in section 56. Section 56 has a pointed end 76 for easy insertion into the earth.

Figure 6:
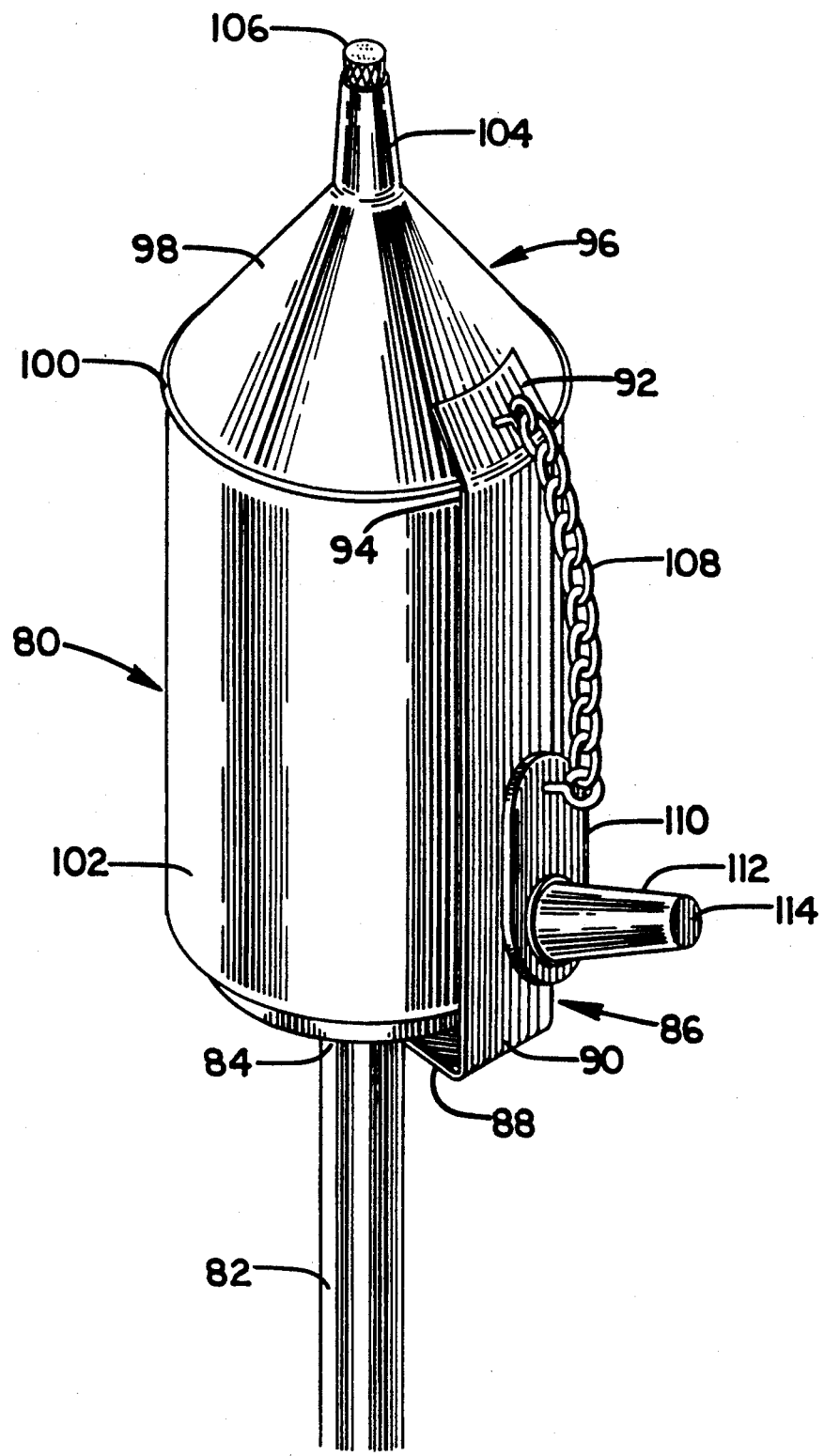
FIG. 6 illustrates a second embodiment of the garden torch.

A second embodiment of the garden torch of this invention is illustrated in FIG. 6, and is indicated generally as 80. Segmented pole 82 is attached at its upper end 84 to a first element (not shown) of bracket 86. Bracket 86 has an inclined element 88, similar to element 18 of bracket 12. Vertical element 90 extends upward from element 88, and has inwardly inclined element 92 extending from end 94 of vertical element 90. Element 92 is attached to funnel 96. Funnel 96 comprises cone 98, at the large diameter of which is bead 100. The inner diameter of bead 100 is approximately the same as the outer diameter of can 102. Spout 104 of funnel 96 extends upwardly from the small end of cone 98. Wick 106 extends slidably through spout 104. Chain 108 extends between inclined element 92 and tab 110. Truncated cone-shaped cap 112 has its larger end attached to an opening (not shown) in tab 110. Cap 112 is closed at its small end by closure 114. The purpose of cap 112 is to protect wick 106 from the elements when the torch is not in use. Torch 80 is assembled in the same manner as torch 10. Wick 106 is inserted into can 102, and the upper end of can 102 is inserted into funnel 96, and the bottom of can 102 is moved toward vertical element 90 and snapped into place. Pole 82 is identical to pole 14 of the first embodiment.

It can be seen from the above that a garden torch has been invented which can utilize an emptied beer or soft drink can as a removable reservoir for illuminating liquid such as torch oil. The height of the torch can be varied by utilizing a greater or smaller number of pole segments. Packaging is simplified by making the pole in segments. There is room on the bracket for a bottler's logo, and the can itself may serve as an advertisement.

While this invention is susceptible of embodiment in different forms, the drawings and the specification illustrate the preferred embodiments of the invention, with the understanding that the present disclosure is to be considered an exemplification of the principles of the invention, and the disclosure is not intended to limit the invention to the particular embodiments described.

I claim:

1. A garden torch comprising:
   a pole;

a bracket having a horizontal lower leg affixed to the top of the pole;

a circular cover forming the upper leg of said bracket, said cover having a hole therein;

a wick slidable within the hole in said cover; and a container having a hole in its top suitable for insertion of the wick, said container being removably insertable into said bracket between the lower bracket leg and the cover.

2. The garden torch of claim 1 wherein the container is a beer can whose contents have been replaced with illuminating liquid.

3. The garden torch of claim 1 wherein the container is a soft drink can whose contents have been replaced with illuminating liquid.

4. The garden torch of claim 1 wherein the garden torch further comprises:

a cap which may be affixed over the wick; and a flexible connector connecting the cap to the bracket.

5. The garden torch of claim 1 wherein the pole is formed of a plurality of segments which may be joined together, the lowermost segment being pointed at its lower end.

6. A garden torch comprising:

a pole;

a bracket having a horizontal lower leg affixed to the top of the pole;

a downward-facing funnel having a spout, said funnel forming the upper leg of said bracket;

a wick slidable within the spout; and a container having a hole in its top suitable for insertion of the wick, said container being removably insertable into said bracket between the lower bracket leg and the funnel.

7. The garden torch of claim 6 wherein the container is a beer can whose contents have been replaced with illuminating liquid.

8. The garden torch of claim 6 wherein the container is a soft drink can whose contents have been replaced with illuminating liquid.

9. The garden torch of claim 6 wherein the garden torch further comprises:

a cap which may be affixed over the wick; and a flexible connector connecting the cap to the bracket.

10. The garden torch of claim 6 wherein the pole is formed of a plurality of segments which may be joined together, the lowermost segment being pointed at its lower end.

* * * * *